United States Patent [19]

Oliver

[11] Patent Number: 5,766,358
[45] Date of Patent: Jun. 16, 1998

[54] WHEEL PAINTING MASK

[76] Inventor: Charles E. Oliver, 23450 Appleton Ave., Faribault, Minn. 55021

[21] Appl. No.: 701,644

[22] Filed: Aug. 22, 1996

[51] Int. Cl.$^6$ .................................................. B05C 11/11
[52] U.S. Cl. ................................................ 118/504; 118/505
[58] Field of Search ....................................... 118/504, 505

[56] References Cited

U.S. PATENT DOCUMENTS

| | | | |
|---|---|---|---|
| 2,081,666 | 5/1937 | Gunn | 118/505 |
| 2,627,839 | 2/1953 | Hudgins et al. | 118/505 |
| 2,634,704 | 4/1953 | Morrison | 118/505 |
| 2,716,391 | 8/1955 | Nonemaker et al. | 118/505 |
| 2,726,634 | 12/1955 | Horner | 118/505 |
| 2,835,222 | 5/1958 | Hall | 118/505 |
| 2,954,752 | 10/1960 | Hayward | 118/505 |
| 4,784,440 | 11/1988 | Fair | 118/505 |
| 4,790,362 | 12/1988 | Price | 118/505 |
| 4,955,670 | 9/1990 | Koller | 118/505 |
| 5,039,172 | 8/1991 | Krieger | 118/505 |
| 5,524,972 | 6/1996 | Cailor et al. | 118/505 |

*Primary Examiner*—Donald E. Czaja
*Assistant Examiner*—Michael P. Colaianni
*Attorney, Agent, or Firm*—D. L. Tschida

[57] ABSTRACT

A molded plastic ring having a mounting flange and a shield flange which collectively mask an automotive or truck tire during the painting of a supporting wheel. A beveled edge of the mounting flange is fitted to the wheel. The mounting flange projects from the shield flange in the range of 95 to 130 degrees. The shield flange extends from the mounting flange in a plane parallel to the wheel and overlies the tire sidewall. The ring is molded from polyethylene or other flexible materials impervious to encountered solvents, cleaners, thinners and curing temperatures. Radial slits or notches can be provided at the mounting flange to facilitate attachment and the mounting and shield flanges can exhibit arcuate curvatures, when viewed on edge.

16 Claims, 7 Drawing Sheets

WHEEL PAINTING MASK

BACKGROUND OF THE INVENTION

The present invention relates to a painting mask for masking an automotive or truck tire during the painting of a supporting wheel.

A frequent task performed in automotive body shops and large equipment paint shops is the re-painting of the steel vehicle wheels. The need can arise during collision repair work, general touch-up work or maintenance to prevent corrosion of exposed metal surfaces at the wheel. Once sprayed, the paint can be baked onto the wheel in an oven at a suitable temperature or be allowed to air cure in a relatively dust free setting.

Normal spray painting techniques permit painting the wheel without overspray striking the vehicle. Without masking the tire, however, it is impossible to prevent paint overspray from covering portions of the tires, which can produce an unsightly work product.

Where appearances are a consideration, normal practice is to attempt to mask off the tire sidewalls before painting. Conventional techniques are to use tape and disposeable media, such as paper or film coverings to mask the tire. Such masking efforts require a good deal of time, due to the contours of the wheel and tire and the necessity of masking each wheel of a vehicle.

A prepared shield may also be supported to each tire or wheel to appropriately mask off the tire sidewall and expose the wheel. U.S. Pat. No. 3,854,448 discloses a cardboard shield which mounts to the tire at tread engaging portions and to the sidewall with double sided tape. A free standing mask is shown at U.S. Pat. No. 4,787,331.

U.S. Pat. No. 3,141,794 discloses a mask which includes a stiff center annulus that aligns to the juncture between the wheel and tire. A ring extends to cover the sidewall and end hooks at a pair of elastic cords mount over the tread surface to adhere to the back of the tire. Once the cords and hooks are set, the position of the mask can be adjusted, which position is retained through the painting operation. The stiff center annulus otherwise is not secured to the wheel or tire.

Other shields with active retainers are shown at U.S. Pat. Nos. 3,192,896; 4,844,005; 4,874,206; and 5,058,958. A semi-circular hand held shield is shown at U.S. Pat. No. 4,628,858.

U.S. Pat. No. 4,790,362 discloses a sidewall shield for protecting a tire against sidewall punctures. The shield is constructed of a number of layers and permanently mounts between the bead of the tire and the wheel. Comparable accessory, whitewall covers are also known which are used to create the appearance of a whitewalled tire for tires of unusual sizes.

No simple assembly exists which mounts to the wheel upon merely pressing the shield to the wheel at the juncture between the tire bead and rim and slightly rotating the shield to seat the shield. The subject invention was developed with the foregoing mounting in mind and to provide a durable, low cost shield which press fits to the wheel to obtain a secure mounting, without obscuring any visible region at the wheel. The cover is durably constructed to withstand exposure to solvents, thinners and heat. The cover may also be flexed to facilitate removal of dry paint or fitting of the cover around wheel weights. The process and time to mask each tire of a four wheel vehicle is reduced with the present cover to a mere matter of minutes for all four wheels of a four wheel vehicle.

SUMMARY OF THE INVENTION

It is accordingly a primary object of the invention to provide a molded plastic cover or mask which mounts to an automotive or truck tire to mask the exposed tire sidewall and prevent the accumulation of paint on the tire during painting of the wheel.

It is a further object of the invention to provide a mask molded from polyethylene and having a tapered mounting flange and a shield flange.

It is a further object of the invention to provide a mounting flange having a beveled mounting edge, which fits between the tire bead and wheel to passively retain the shield to the wheel.

It is a further object of the invention to provide a discontinuous shield having ends which can be overlapped to fit multiple wheel diameters and which may also include fasteners to retain the ends.

It is a further object of the invention to provide a mask which may include a number of radial slits or notches at the peripheral edge of the mounting flange.

It is a further object of the invention to provide a mask having a beveled edge at the mounting flange and which flange extends from the shield flange in the range of 95 to 130 degrees.

Various of the foregoing objects, advantages and distinctions of the invention are obtained in a preferred mask which provides a continuous annular ring molded from a polyethylene material. A mounting flange provides a beveled edge which press fits between the wheel rim and tire. The mounting flange tapers outward to a shield flange which overlays the tire.

In an alternative construction, the ring is cut to provide overlapping ends. Mating fasteners can be provided at the ends and the mounting edge can include radial slits or notches to flex and accommodate wheel weights, valve stems etc.

Still other objects, advantages and distinctions of the invention will become more apparent from the following description with respect to the appended drawings. To the extent various modifications and improvements have been considered, they are described as appropriate. The description should not be strictly construed in limitation of the invention. Rather, the invention should be interpreted within the scope of the further appended claims.

DESCRIPTION OF THE PREFERRED EMBODIMENT

Figure 1:
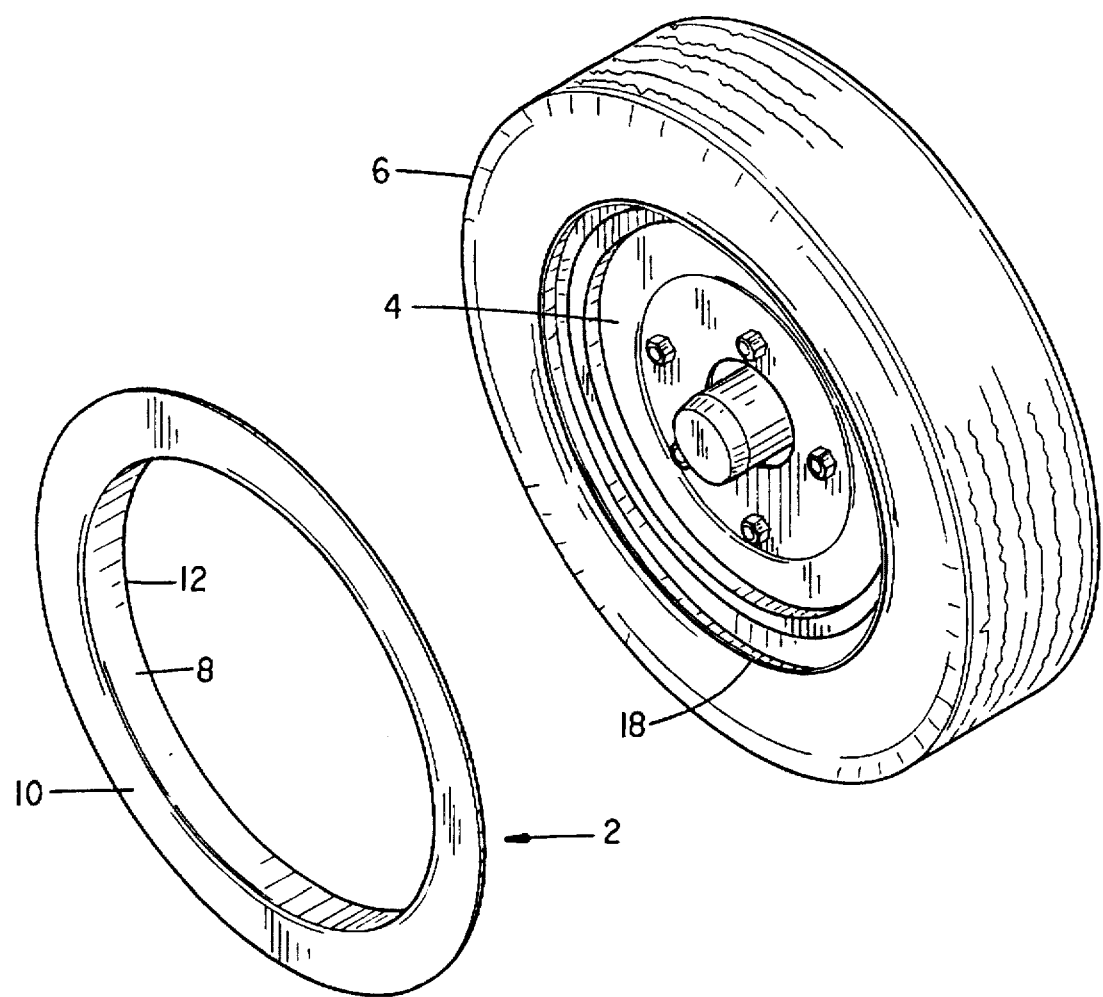
FIG. 1 is a perspective drawing shown in exploded assembly of the mask removed from a typical automotive wheel.
Figure 2:
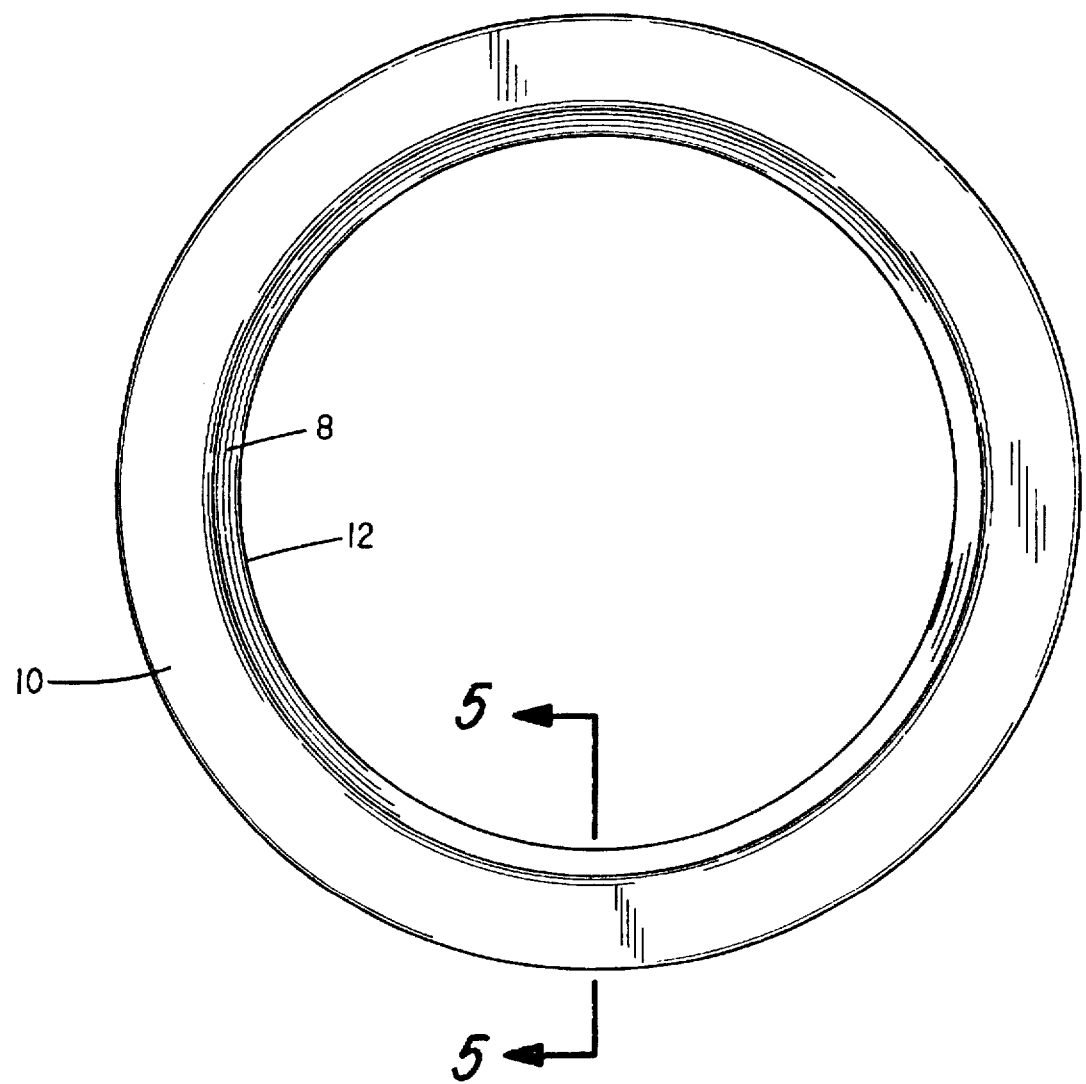
FIG. 2 is a front plan view of the mask.
Figure 3:
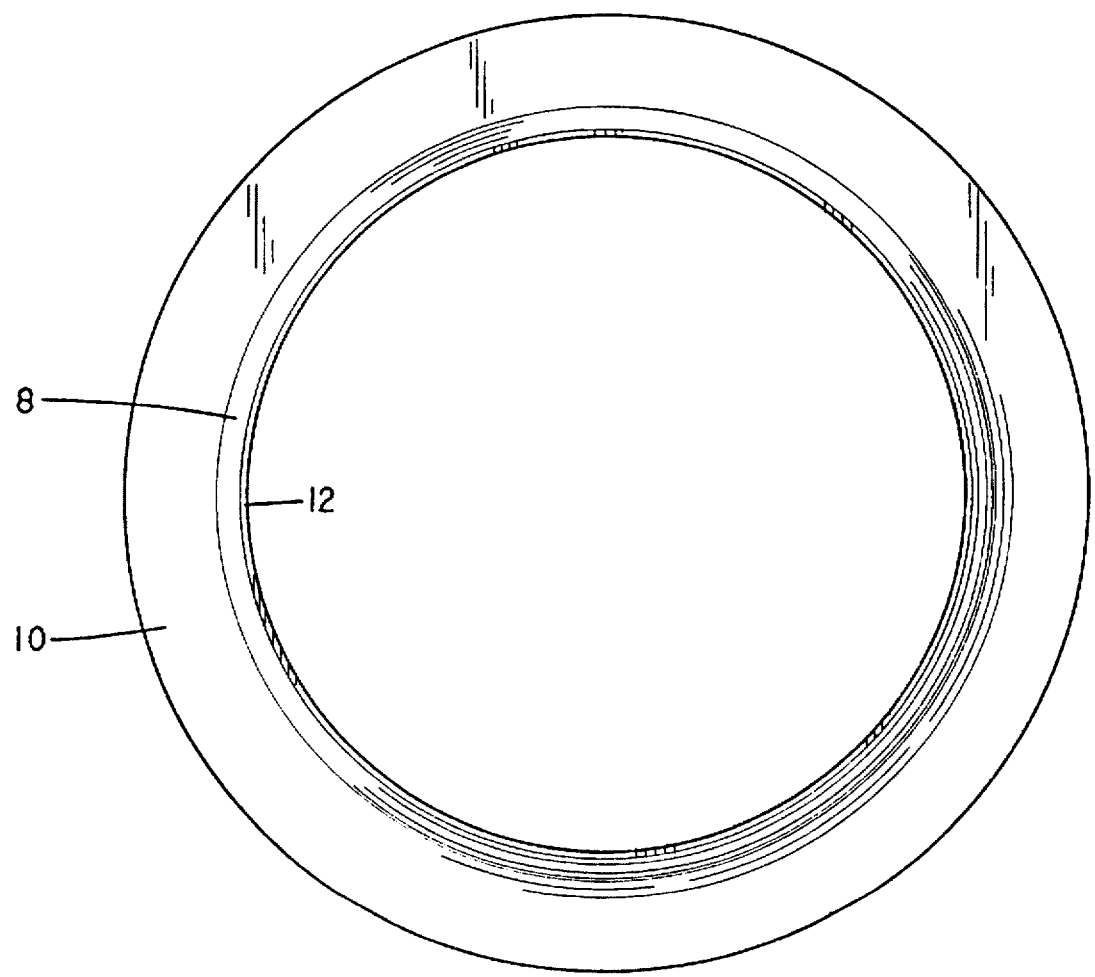
FIG. 3 is a rear plan view of the mask.
Figure 4:
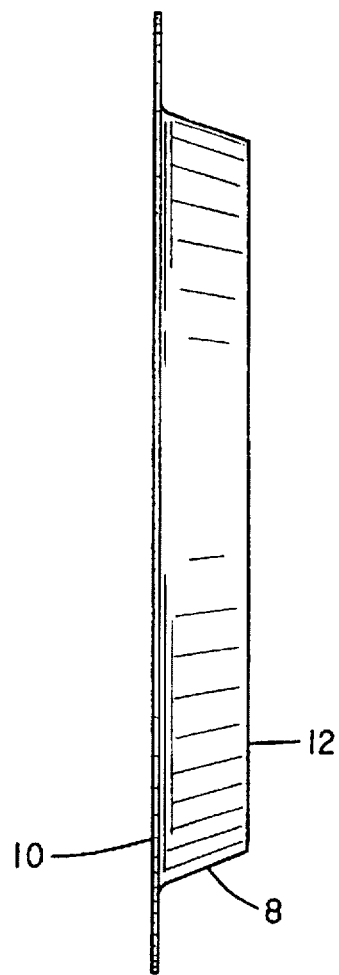
FIG. 4 is a right side elevation view of the mask.

Referring to FIG. 1, a perspective drawing is shown in exploded assembly of the painting mask 2 of the invention in relation to a vehicle wheel 4 and tire 6. The mask 2 is molded as a continuous annular ring from a durable, flexible plastic. FIGS. 2 through 5 show various planar views of the mask 2.

The mask 2 includes a mounting flange 8 and a shield flange 10. The mounting flange 8 tapers outward from an inner peripheral mounting edge 12 to the shield flange 10. The shield flange generally overlies the sidewall of the tire 6 in coplanar relation thereto. The mounting flange 8 projects at an outward taper and angle "A" in the range of 15 to 40 degrees from an axis 14 perpendicular to the wheel 4 and to the shield flange 10 or in the range of 95 to 140 degrees from the shield flange, reference FIG. 5. An optimal angle for automotive wheels is believed to be 20 degrees.

The mounting flange 8 extends a sufficient distance to displace the shield flange 10 and accommodate the curvature of the sidewall at the tire 6, typically 1½ to 2 inches. The shield flange 10 is typically sized to extend in the range of 3 to 5 inches, although might completely cover the tire sidewall. The flanges 8, 10 can be constructed to exhibit an arcuate profile when viewed on edge, which increases the stiffness of the mask. Preferrably, the mask must exhibit sufficient rigidity to facilitate the pressing and twisting forces required to facilitate mounting.

Figure 5:
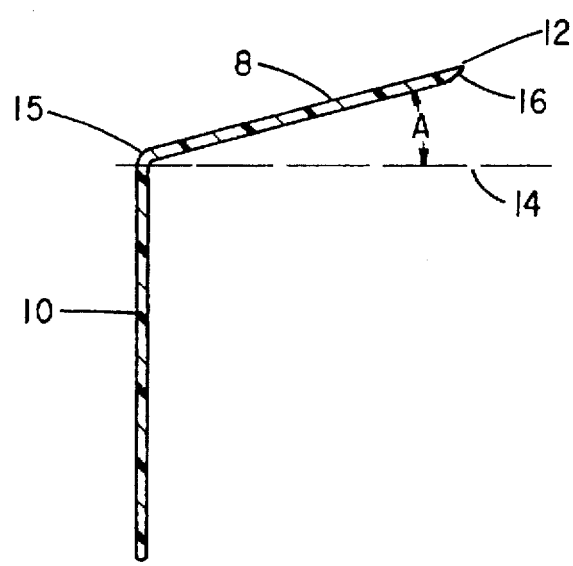
FIG. 5 is a cross section view taken along section lines 5—5 of FIG. 1.

The transition 15 from the mounting flange 8 to the shield flange 10 can be relatively abrubt as shown in FIG. 5. The transition between the flanges can also exhibit an arcuate curvature, reference FIG. 7. A radius 60 on the order of ¼ to 1½ inches is believed sufficient to accomodate most wheels. A larger radius also promotes rigidity at the mask 2.

The mounting edge 12 includes a single taper bevel 16, which facilitates the mounting of the edge 12 between the tire 6 and the bead 18 of the wheel 4. Upon positioning the edge 12 at the bead 18, pressing and slightly turning the mask 2, the bevel 16 is fitted between the tire 6 and wheel 4. A friction fit is obtained which retains the mask 2 to shield the wheel 4 during painting. No other retainers are required. A double taper bevel might also be used, reference FIG. 7.

The mask 2 is presently molded from a polyethylene plastic, although a variety of other materials might be used to equal advantage. A polyethylene material is tolerant to thinners and solvents used with typical vehicle paints. The material can be subjected to the temperatures of conventional paint booths. Once the vehicle is painted, the mask 2 can remain in place, until the paint is baked, which prevents possible marring that might arise during mask removal. The material flexes to both accommodate mounting and facilitate paint removal.

The mask 2 can be molded using a variety of conventional molding techniques from vacuum forming to blow molding to injection molding. The material thickness can be varied relative to the mask diameter, for example, a range of 0.060 to 0.100 inches is believed adequate for masks sized to fit wheel diameters from 13 to 22 inches.

Figure 6:
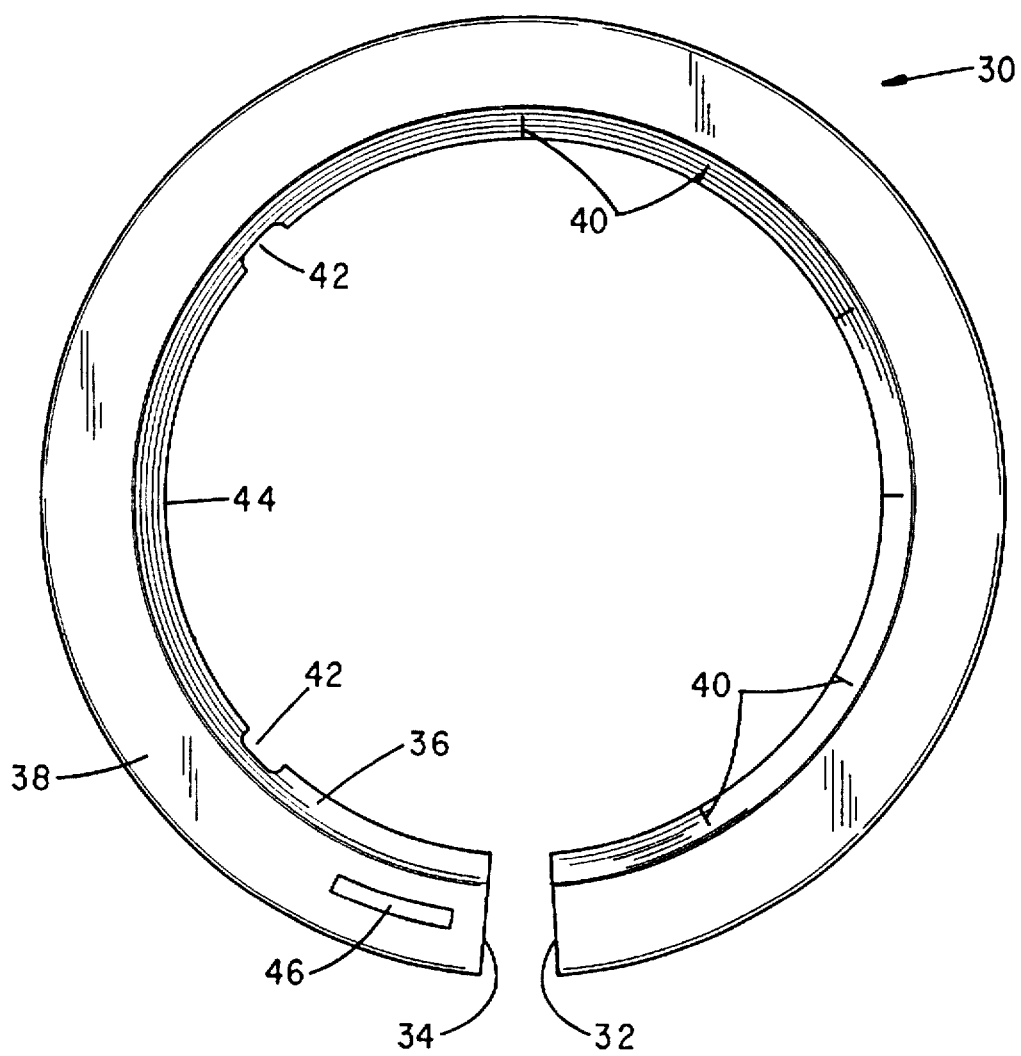
FIG. 6 is a front plan view of a split ring mask which is adaptable to wheels of a range of diameters.

FIG. 6 depicts a painting mask 30 that is constructed to fit a range of wheels of differing diameters. The mask 30 is formed in a split configuration. That is, the mask 30 has discrete ends 32, 34. Upon being fit to a wheel 4, the ends 32, 34 overlap one another to differing degrees, depending upon the wheel diameter. Nominally, each mask 30 is sized to fit wheels having a 2 inch difference in diameter. The mask 30 might therefore fit 13 to 15 inch diameter wheels, which are most commonly found on automobiles.

A mounting flange 36 extends to a shield flange 38. The mounting flange 36 includes a number of radial slits 40 and/or notches 42 that are radially inlet at a mounting edge 44 an appropriate distance to sustain necessary rigidity at the mounting flange 36, promote mask mounting, yet flex to accomodate wheel weights or intermittent rough edges at the wheel rim as the mask is fitted to the wheel. The numbers and locations of slits 40 and notches 42 can be varied as desired. The mounting edge 44 can provide a single or double beveled taper.

Mating fasteners 46, only one of which is shown, are provided at the overlapping ends 32, 34. The fasteners 46 mate with one another to retain the ends 32, 34 to one another during painting and prevent paint spray from penetrating between the ends. Depending upon the amount of overlap, the fasteners 46 may not be required. A VELCRO material is presently preferred, although a variety of other fasteners might be used to equal advantage.

Figure 7:
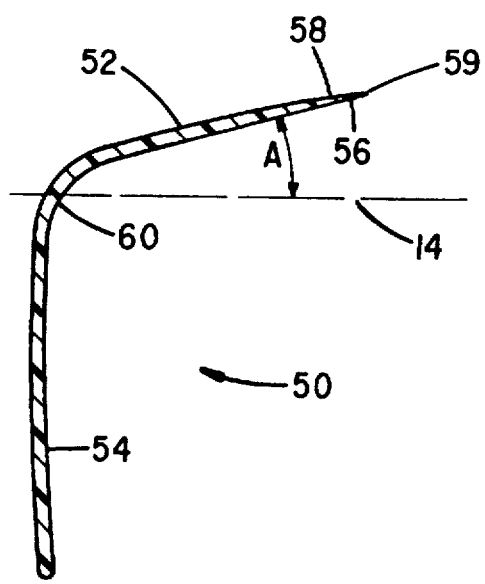
FIG. 7 is a cross section view through a mask having a double beveled mounting edge and an arcuate transition from the mounting to the shield flange.

FIG. 7 depicts a mask 50 having a double tapered mounting flange 52 and a shield flange 54. Beveled surfaces 56 and 58 extend to an apex or knife edge 59 to facilitate attachment of the mask 50. The mask 50 can be constructed to include radial slits 40 or notches 42 to further facilitate the mounting of the mask 50 to a wheel. The mounting flange 52 arcuately extends into the shield flange 54. Reliefs can also be provided at the transition region between the mounting and shield flanges to improve the rigidity of the mask 50. Similarly, the flanges 52, 54 can be constructed to exhibit an arcuate profile when viewed on edge, which increases also the stiffness of the mask.

While the invention has been described with respect to a number of presently preferred constructions and various considered modifications and improvements, it is to be appreciated still other constructions may suggest themselves to others skilled in the art. The appended claims should therefore be construed to include all those equivalent embodiments within the spirit and scope thereof.

What is claimed is:

1. A painting mask for a vehicle wheel comprising an endless ring having an integral mounting flange and a shield flange, wherein said shield flange comprises a planar annulus, wherein said mounting flange projects from said shield flange in the range of 95 to 130 degrees, wherein a peripheral edge of said mounting flange includes a beveled surface, and wherein a plurality of slits extend from said peripheral edge of said mounting flange, whereby the mask is retained to the wheel upon press fitting the beveled surface between a tire and the wheel and said shield flange overlies a sidewall of said tire.

2. A painting mask as set forth in claim 1 wherein said slits radially extend from said peripheral edge.

3. A painting mask as set forth in claim 1 wherein at least one notch radially extends from said peripheral edge.

4. A painting mask as set forth in claim 3 wherein said slits radially extend from said peripheral edge.

5. A painting mask as set forth in claim 1 molded from a polyethylene material.

6. A painting mask as set forth in claim 1 wherein at least one of said mounting flange and said shield flange exhibits an arcuate curvature when viewed on edge.

7. A painting mask as set forth in claim 1 wherein a single beveled surface is provided at the peripheral edge of the mounting flange.

8. A painting mask as set forth in claim 1 wherein said peripheral edge of the mounting flange includes first and second beveled surfaces which taper to an apex at the peripheral edge of the mounting flange.

9. A painting mask for a vehicle wheel comprising an endless annular ring having a mounting flange and a shield flange, wherein said shield flange comprises a planar annulus, wherein said mounting flange projects from said shield flange in the range of 95 to 130 degrees, and wherein a peripheral edge of said mounting flange includes at least one beveled surface, whereby the mask is retained to the wheel upon press fitting the peripheral edge of the mounting flange between a tire and the wheel and said shield flange overlies a sidewall of said tire.

10. A painting mask as set forth in claim 9 wherein a plurality of radial slits radially extend from said peripheral edge of the mounting flange.

11. A painting mask as set forth in claim 9 wherein at least one notch radially extends from said peripheral edge of the mounting flange.

12. A painting mask as set forth in claim 9 wherein said peripheral edge of said mounting flange includes first and second beveled surfaces which taper to an apex at the peripheral edge of said mounting flange.

13. A painting mask for a vehicle wheel comprising a band having first and second ends, a mounting flange and a shield flange, wherein said mounting flange projects from said shield flange in the range of 95 to 130 degrees, wherein a peripheral edge of said mounting flange includes at least one beveled surface, wherein a plurality of slits extend from said peripheral edge of said mounting flange, and wherein the first and second ends overlap one another, whereby the mask is retained to the wheel upon press fitting the peripheral edge of the mounting flange between a tire and the wheel and said shield flange overlies a sidewall of said tire.

14. A painting mask as set forth in claim 13 wherein said first and second ends include fasteners which mate with one another upon overlapping the first and second ends.

15. A painting mask as set forth in claim 13 wherein at least one notch radially extends from said peripheral edge of the mounting flange.

16. A painting mask as set forth in claim 13 wherein said peripheral edge of the mounting flange includes first and second beveled surfaces which taper to an apex at the peripheral edge of the mounting flange.

\* \* \* \* \*